(12) United States Patent
Grivna

(10) Patent No.: US 9,285,930 B2
(45) Date of Patent: Mar. 15, 2016

(54) ELECTRET STYLUS FOR TOUCH-SENSOR DEVICE

(75) Inventor: Edward L. Grivna, Brooklyn Park, MN (US)

(73) Assignee: Wacom Co., Ltd., Saitama (JP)

( * ) Notice: Subject to any disclaimer, the term of this patent is extended or adjusted under 35 U.S.C. 154(b) by 1064 days.

(21) Appl. No.: 12/151,858

(22) Filed: May 9, 2008

(65) Prior Publication Data

US 2012/0043142 A1 Feb. 23, 2012

Related U.S. Application Data

(60) Provisional application No. 60/916,963, filed on May 9, 2007.

(51) Int. Cl.
*G06F 3/033* (2013.01)
*G06F 3/044* (2006.01)
*G06F 3/0354* (2013.01)

(52) U.S. Cl.
CPC ............ *G06F 3/044* (2013.01); *G06F 3/03545* (2013.01)

(58) Field of Classification Search
CPC ............................... G06F 3/03545; H01G 7/02
USPC ................................. 178/19.3, 19.03; 345/179
See application file for complete search history.

(56) References Cited

U.S. PATENT DOCUMENTS

| | | | | |
|---|---|---|---|---|
| 1,972,119 A | * | 9/1934 | Wernhardt | 411/456 |
| 2,695,363 A | * | 11/1954 | Marvin | 250/375 |
| 2,859,354 A | * | 11/1958 | Hollmann | 250/378 |
| 3,118,022 A | | 1/1964 | Sessler et al. | |
| 3,258,775 A | * | 6/1966 | Munz | 346/140.1 |
| 3,449,094 A | * | 6/1969 | Baxt et al. | 307/400 |
| 3,711,852 A | * | 1/1973 | Firnig | 341/173 |
| 3,821,469 A | * | 6/1974 | Whetstone et al. | 178/18.04 |
| 3,883,258 A | * | 5/1975 | Hewson | 403/298 |
| 3,888,174 A | * | 6/1975 | Gaynor | 101/467 |
| 3,921,259 A | * | 11/1975 | Brumlik | 24/451 |
| 3,924,324 A | * | 12/1975 | Kodera | 29/592.1 |
| 3,983,322 A | * | 9/1976 | Rodgers | 178/20.04 |
| 4,022,971 A | * | 5/1977 | Rodgers | 178/20.04 |
| 4,156,566 A | * | 5/1979 | Thiele | 396/281 |
| 4,291,245 A | | 9/1981 | Nowlin et al. | |
| 4,672,154 A | * | 6/1987 | Rodgers et al. | 178/19.07 |
| 4,695,680 A | * | 9/1987 | Kable | 178/19.01 |
| 4,767,973 A | * | 8/1988 | Jacobsen et al. | 318/652 |
| 4,770,585 A | * | 9/1988 | Astl | 411/446 |
| 5,198,740 A | * | 3/1993 | Jacobsen et al. | 318/687 |
| 5,379,057 A | | 1/1995 | Clough et al. | |

(Continued)

FOREIGN PATENT DOCUMENTS

EP 48902 A2 * 4/1982
SU 291149 A1 * 7/1981

OTHER PUBLICATIONS

Barnett, "Elements of Electromagnetic Theory", The Macmillan Company, 1903, pp. 176-191.*

(Continued)

*Primary Examiner* — Dorothy Harris
(74) *Attorney, Agent, or Firm* — Seed IP Law Group PLLC

(57) ABSTRACT

A method and apparatus to couple a piece of electret material to a touch-sensor device stylus, where the electret material emits an electrostatic field to be sensed by a touch-sensor device.

20 Claims, 6 Drawing Sheets

(56) References Cited

U.S. PATENT DOCUMENTS

| | | | |
|---|---|---|---|
| 5,402,151 A * | 3/1995 | Duwaer | 345/173 |
| 5,750,939 A * | 5/1998 | Makinwa et al. | 178/18.01 |
| 5,790,106 A * | 8/1998 | Hirano et al. | 345/173 |
| 6,124,848 A * | 9/2000 | Ballare et al. | 345/179 |
| 6,267,527 B1 * | 7/2001 | Miller | 403/292 |
| 6,690,156 B1 | 2/2004 | Weiner et al. | |
| 6,762,752 B2 | 7/2004 | Perski et al. | |
| 7,292,229 B2 | 11/2007 | Morag et al. | |
| 2002/0190964 A1 * | 12/2002 | Van Berkel | 345/173 |
| 2003/0118391 A1 * | 6/2003 | Adams | 401/116 |
| 2004/0095333 A1 | 5/2004 | Morag et al. | |
| 2004/0155871 A1 | 8/2004 | Perski et al. | |
| 2004/0178995 A1 * | 9/2004 | Sterling | 345/173 |
| 2005/0162411 A1 * | 7/2005 | Berkel van | 345/179 |
| 2005/0189154 A1 | 9/2005 | Perski et al. | |
| 2006/0012580 A1 | 1/2006 | Perski et al. | |
| 2006/0012581 A1 | 1/2006 | Haim et al. | |
| 2006/0069967 A1 | 3/2006 | Almy et al. | |
| 2006/0097991 A1 * | 5/2006 | Hotelling et al. | 345/173 |
| 2006/0232567 A1 * | 10/2006 | Westerman et al. | 345/173 |
| 2007/0171211 A1 | 7/2007 | Perski et al. | |
| 2007/0195068 A1 * | 8/2007 | Kable et al. | 345/179 |
| 2007/0242056 A1 | 10/2007 | Engelhardt et al. | |
| 2007/0268272 A1 | 11/2007 | Perski et al. | |
| 2007/0285404 A1 | 12/2007 | Rimon et al. | |
| 2008/0158198 A1 * | 7/2008 | Elias | 345/174 |

OTHER PUBLICATIONS

Stanford et al, Physics for Students of Science and Engineering, Academic Press, Inc, 1985, pp. 309-418.*

Oda et al, Charging Characteristics of a Non-Woven Sheet Air Filter, 6th International Symposium on Electrets (ISE 6) Proceedings, Oxford England 1988, Edited by K Das-Gupta et al, pp. 515-519.*

Dufresne, Electrets, Jul. 2006, pp. 1-3 downloaded from http://www.walkingitaly.com/radio/radioprogetti/elettreti/Electrets1.htm, Nov. 3, 2014.*

Derwent English language abstract for SU291149A1.*

"MicroTouch: Resistive Touch Screens", 3M Touch Systems, USA, 2002.

"Inductive Position Sensing", Synaptics Technologies, downloaded from http://www.synaptics.com/technology/ips.cfm, May 8, 2008.

"Dell Latitude XT Tablet", Dell Inc., Dec. 2007.

"Digitizer Pen", downloaded from http://www.motioncomputing.com/choose/spec_pen_L.htm, May 8, 2008.

"Sensopad Technology Overview: Version 1.0", Sensopad, Mar. 13, 2001.

"Ingenico 6770", Groupe Ingenico, Oct. 2007.

"MicroTouch TouchPen System: for ClearTek II Touch Screens", 3M Touch Systems, 2007.

"Designing a Dual PS/2 Touch Stick/Touchpad Controller", Cirque Corporation, Application Note: GP-AN-070409, 2007.

"Extreme Touch", Touch International, downloaded from http://www.touchinternational.com/literature/datasheets/extremetouch.pdf, May 8, 2008.

"EMR (Electro-Magnetic Resonance) Technology", Wacom, 2007.

"Electrostatic Pen: Advanced Battery-free Stylus", N-trig, downloaded from http://www.n-trig.com/Content.aspx?Page=ElectrostaticPen, May 8, 2008.

"Making an Electret", Jul. 20, 2002, downloaded from http://www.geocities.com/ResearchTriangle/Lab/1135/electret.htm, May 8, 2008.

Eguchi, Mototaro "On the Permanent Electret", Philosophical Magazine, vol. 49, 1925.

Stong, C.L. "How to Make and Electret: the Device That Permanently Maintains an Electric Charge", Scientific America, Nov. 1960.

* cited by examiner

ELECTRET STYLUS FOR TOUCH-SENSOR DEVICE

RELATED APPLICATIONS

This application claims the benefit of U.S. Provisional Application No. 60/916,963 filed on May 9, 2007.

TECHNICAL FIELD

This invention relates to the field of user interface devices and, in particular, to a stylus for a touch-sensor device.

BACKGROUND

Computing devices, such as notebook computers, personal data assistants (PDAs), kiosks, and mobile handsets, have user interface devices, which are also known as human interface devices (HID). These interface devices may include touch-sensor devices such as a touchpad or a touch screen. Conventional touchpads or touch screens allow a user to interact using his or her finger. However, a stylus may be useful for interacting with a touch-sensor device. A stylus provides two distinct advantages to a user compared to interacting with a touch-sensor device using only a finger. First, a stylus has a smaller area of contact with the touch-sensor device than a finger. A typical finger may have an area of contact of approximately 10 millimeters in diameter, where a stylus may have an area of contact of approximately 1 square millimeter ($mm^2$). The smaller area of contact offered by the stylus allows the user to more accurately interact with the desired portion of the touch-sensor device. The second advantage is that the user can better see where he or she is interacting with the touch-sensor device because the stylus covers less of the display screen. A user's finger and hand may obscure a portion of the touch-sensor device when the user reaches out to contact the touch-sensor device. A stylus, especially near the point of contact with the touch sensor, is ideally much thinner than a finger and will not obscure as large a portion of the touch-sensor device while being used.

Several different stylus alternatives are currently available, but each has drawbacks which make them less than ideal. The first is a stylus designed for use with a resistive touch screen. A resistive touch screen generally is made from two layers of transparent conductive material (e.g., Indium Tin Oxide, stannous oxide, carbon nanotubes, graphene, PEDOT-PSS) separated by air. A typical stylus may include a piece of plastic with a radiused end made from a slippery polymer (e.g., high-density polyethylene (HDPE), ultra high molecular weight polyethylene (UHMWPE), TEFLON™, RULON™) to prevent scratching of the surface of the screen. Nevertheless, with a resistive touch screen anything hard enough to cause the top layer to deflect into contact with the bottom layer can be used as a stylus, such as a pencil, pen, fingernail, credit card, etc. The problem in this case is not with the stylus itself, but with the resistive touch screen. Resistive touch screens are failure prone due to wear out or fracture of the indium tin oxide (ITO) material from repeated flexing. The smaller radius of the stylus (relative to that of a finger) decreases the bend radius of the top layer of such a touch screen, accelerating the failure of the touch screen from repeated flexing of the ceramic ITO layer. Resistive touch screens also suffer high light loss due to the air gap present between the active layers.

The second type of stylus is an inductively-powered stylus using technology from a company such as Wacom Co., Ltd. of Japan or Sensopad Limited of the United Kingdom. In these systems, there may not be a touch sensitive screen in place, though the inductive stylus does not preclude its use or presence. The inductively-powered stylus includes an inductor-capacitor (LC) tank circuit. Magnetic coils, either below or around the display surface, are energized and couple power to the stylus. When the power to these coils in the display is turned off, the energy present in the tank circuit is then output by the stylus. As the magnetic field from the stylus collapses, the stylus couples power back into the coils in the display where the location can be sensed. The inductively-powered stylus requires additional electronic circuitry within the stylus itself, thereby increasing the cost of the stylus. Additionally, the separate coils in the display that couple power to the stylus are not very efficient at power transfer. This limits the operable life in portable applications due to battery drain. The coils also increase the bulk and thickness of the display section.

Another type of stylus is a tethered stylus similar to that from Ingenico of France as used with their POS (point-of-sale) systems. The stylus may be tethered to the POS system primarily to prevent it from being removed, but it also requires an electrical connection through the tether to provide power and allow proper communication with the host system. Here the touch screen is presented with a sinusoidal signal at around 250 kHz that is driven alternately horizontally and vertically across the ITO touch screen surface. Since this is driven as a current through a non-inductive media, the touch screen forms a linear voltage divider (similar to that of a resistive touch screen). The relative field amplitude at the surface of the touch screen is directly related to the relative voltage amplitude remaining in each of the X and Y positions. The stylus for this consists of a mechanical switch at the contact end of the stylus to indicate the presence of a stylus on the touch screen, and an antenna plus amplifier contained within the stylus body to receive a signal from the panel. The amplitude of this signal is communicated back to the host system where it is then analyzed in both the X and Y directions to determine a touch location for the stylus.

Another type of tethered stylus is offered by 3M of Minnesota or Cirque Corporation of Utah. Touch International of Texas is one company that uses the Cirque solution. Here the stylus is powered through the tether and is used to inject a signal into the touch screen. The touch screen then uses the same sensing techniques used to detect a finger to also detect the stylus. In the case of the 3M solution, the stylus is configured to couple a dynamic current opposite that presented by a human body. This allows the controller to be able to distinguish the difference between the two. While this design may be functional, additional power is required to drive the circuitry in the stylus and the tether itself may not be desirable in many applications.

Another stylus type is a merging of the inductive powering mechanisms, with that of the tethered stylus technique. Here, instead of using a tether or cable to provide power to the pen, the power is delivered through inductive coupling. Once the pen has power, the power is used to create an electrostatic field that can be sensed by the touch screen. This design suffers from similar drawbacks to those discussed above, such as increased cost and stylus complexity.

Yet another type of stylus is a completely passive conductive stylus as illustrated in FIG. 1. Such a conductive stylus can couple the natural capacitance of the user's body to the touch-sensor device. The stylus includes a gimbal-jointed tip to allow free movement, but still requires a large contact area in order to effectively couple the body's capacitance. The large contact area effectively eliminates many of the benefits of using a stylus, such as accurate interaction and increased visibility. FIG. 1 illustrates a completely passive conductive stylus.

BRIEF DESCRIPTION OF THE DRAWINGS

The present invention is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to provide a non-conductive stylus for use with a capacitive sensing panel. In one embodiment, the stylus includes a piece of electret material coupled to one end of the stylus. The electret material presents an electrostatic field without any external power source. The electrostatic field may be detected by a capacitive touch-sensing device and the location of the stylus may be determined.

Figure 1:
FIG. 1 illustrates a passive conductive stylus.
Figure 2:
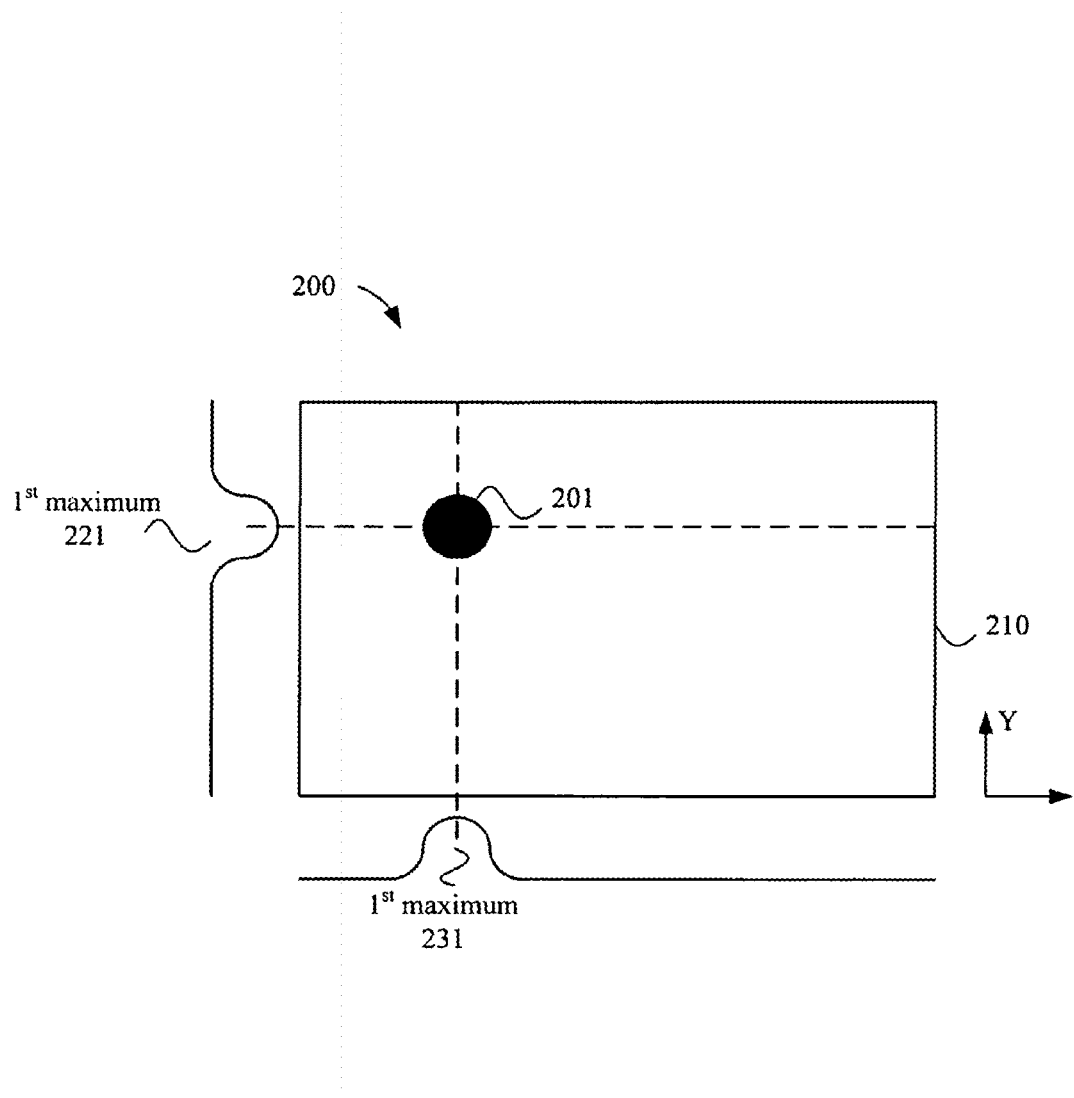
FIG. 2 illustrates one embodiment of a detection profile of a single touch with a first type of capacitive touch-sensing device.

FIG. 2 illustrates one embodiment of a detection profile 200 of a touch 201 with a touch-sensing device 210 noted above, as detected when scanning the rows and columns of an XY matrix. The location of the touch 201 on the Y-axis is determined from the calculated centroid of additional electrostatic field (e.g., 1st maximum 221) of the scanned rows in the matrix, and the location on the X-axis is determined from the calculated centroid of additional electrostatic field (e.g., 1st maximum 231) of the scanned columns of the same matrix. The methods described below can be used to determine the location of a touch anywhere on the touch screen. Note also that, unlike the human body which always presents a path to ground for charge coupled from a dynamic electrostatic field, an electret may present either a positive or negative field. Thus in one polarity it may be sensed as an increase in capacitance, while in the opposite polarity it may be sensed as a decrease in capacitance.

In one embodiment, touch-sensing device 210 may be a touch-sensor pad (also commonly referred to as a touchpad). A notebook computer touch-sensor pad emulates the function of a personal computer (PC) mouse. A touch-sensor pad may be embedded into a PC notebook for built-in portability. A touch-sensor pad replicates mouse X/Y movement by using two defined axes which contain a collection of sensor elements that detect the position of the stylus. The touch-sensor pad provides a user interface device for performing such functions as positioning a pointer, selecting an item on a display, or other gesture; e.g., handwriting, graphic entry, or character entry. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

One type of touchpad operates by way of capacitance sensing utilizing an array of sensors. The electrostatic field created and measured by a sensor changes as a function of the proximity of the stylus to the sensor. In a touch-sensor device, a change in electrostatic field detected by each sensor in the X and Y dimensions of the sensor array due to the proximity or movement of the stylus can be measured by a variety of methods. Regardless of the method, usually an electrical signal representative of the equivalent capacitance of the electrostatic field detected by each sensor is processed by a processing device, which in turn produces electrical or optical signals representative of the position of the stylus in relation to the touch-sensor pad in the X and Y dimensions. A touch-sensor strip, slider, or button operates on the same sensing principle.

In another embodiment, touch-sensing device 210 may be a touch screen. Touch screens, also known as touchscreens, touch panels, or touchscreen panels are display overlays which are typically either pressure-sensitive (resistive), electrically-sensitive (capacitive), acoustically-sensitive (SAW—surface acoustic wave) or photo-sensitive (infrared). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point of sale systems, on ATMs, on mobile handsets, on kiosks, on game consoles, and on PDAs where a stylus is sometimes used to manipulate the graphical user interface (GUI) and to enter data.

Two-layer XY matrix touchpad/touch screen designs may be arranged as two independent linear sliders, placed physically orthogonal to each other, and substantially filling a planar area. Using a centroid, or other processing, algorithm to determine the peak or null in sensed capacitance, one slider is used to determine the X location of the stylus and the second slider is used to determine the Y location of the stylus. This is shown in FIG. 2, where the touch 201 represents the location of the stylus on the touch-sensing device.

Figure 3:
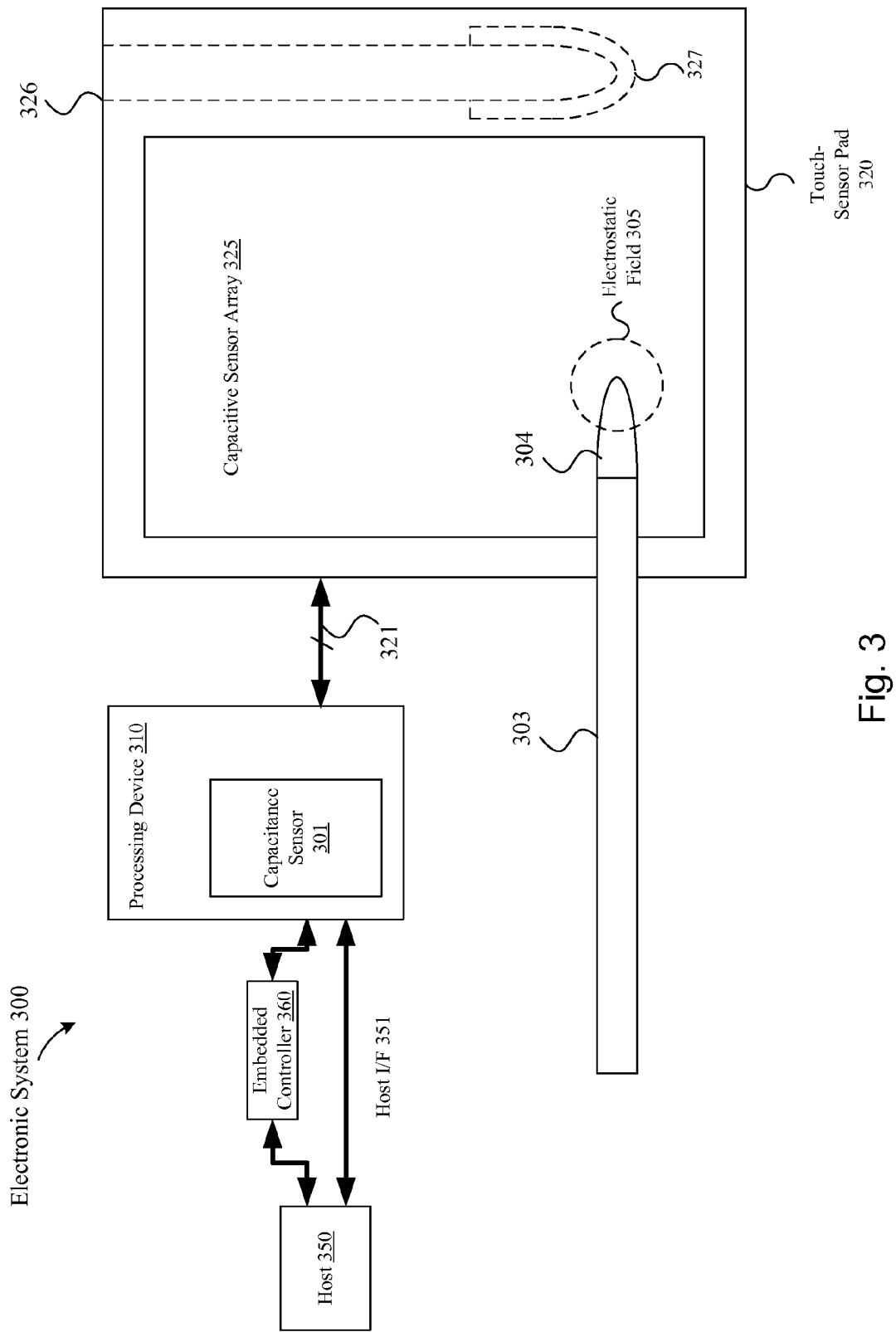
FIG. 3 illustrates a block diagram of one embodiment of an electronic system having a processing device for detecting a presence of a conductive, charged, or polarized object.

FIG. 3 illustrates a block diagram of one embodiment of an electronic system having a processing device for detecting a presence of a conductive, charged, or polarized object. Electronic system 300 includes processing device 310, and touch-sensor pad 320. As illustrated, capacitance sensor 301 may be integrated into processing device 310.

In one embodiment, the electronic system 300 includes a touch-sensor pad 320 coupled to the processing device 310 via bus 321. Touch-sensor pad 320 may include a two-dimension sensor array. The two-dimension sensor array includes multiple sensor elements, organized as rows and columns. In another embodiment, the touch-sensor pad may be replaced with or additionally include a touch-sensor slider or one or more touch-sensor buttons. A touch-sensor slider may include a single-dimension sensor array. The single-dimension sensor array includes multiple sensor elements, organized as rows, or, as columns, or alternatively, as radial elements. The one or more touch-sensor buttons may include a single-dimension or multi-dimension sensor array. The single- or multi-dimension sensor array may include multiple sensor elements. For touch-sensor buttons, touch-sensor sliders, or an n-dimensional touch sensor array, the sensor elements may be coupled together to detect a presence of a conductive, charged, or polarized object over the entire surface of the sensing device. Alternatively, the touch-sensor button has a single sensor element to detect the presence of the object. In one embodiment, the touch-sensor button may be a capacitance sensor element. Capacitance sensor elements may be used as non-contact sensors. These sensor elements, when protected by an insulating layer, offer resistance to severe environments.

In one embodiment, touch-sensor pad 320 may include a socket 326 within the frame of the sensor array. The interior surface of the socket may include a lining of conductive material 327. The socket 326 may be used to store the stylus when not in use. The conductive lining 327 should be oriented so that it will contact the surface of the electret tip 304 when the stylus is place within the socket. Further description of socket 326 and lining 327 are provided below with respect to FIGS. 6A and 6B.

The electronic system 300 may include any combination of one or more of the touch-sensor pad 320, a touch sensor screen, a touch-sensor slider, and touch-sensor buttons. In one embodiment, bus 321 may be a single bus. Alternatively, the bus may be configured into any combination of one or more separate signals or buses.

In one embodiment, touch-sensor pad 320 may be similar to the touch-sensing device described above. Touch-sensor pad 320 may include capacitive sensor array 325. Capacitive sensor array 325 may include rows and columns of capacitive sensors designed to detect a touch in both the X and Y dimensions. In one embodiment, a stylus 303 may be used to interact with touch-sensor pad 320. Stylus 303 may have one end made of electret material 304. The electret 304 may emit an electrostatic field 305 that can be sensed by sensor array 325 in touch-sensor pad 320. The electrostatic field 305 may be used to determine the location of the stylus 303 in relation to the touch-sensor pad 320.

In one exemplary embodiment, processing device 310 may be the Programmable System on a Chip (PSoC®) processing device, developed by Cypress Semiconductor Corporation, San Jose, Calif. Alternatively, processing device 310 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the equivalent capacitance on the sensing device and sends the raw data to a host computer 350 where it is analyzed by an application. In effect the processing that is done by processing device 310 may also be done in the host 350. In another embodiment, the processing device 310 is the host. In one embodiment, processing device 310 may be coupled to embedded controller 360 to communicate with host 350. In another embodiment, host 350 may be directly coupled to processing device 310 through host interface (I/F) 351.

Embodiments of the method and apparatus described herein may be implemented in a fully self-contained sensing device, which outputs fully processed X/Y movement and gesture data signals or data commands to a host. In another embodiment, the method and apparatus may be implemented in a sensing device, which outputs X/Y movement data to a host, and where the host processes the received data to detect gestures. In another embodiment, the method and apparatus may be implemented in a sensing device, which outputs raw capacitance data to a host, where the host processes the capacitance data to compensate for quiescent and stray capacitance, and calculates X/Y movement and detects gestures by processing the capacitance data. Alternatively, the method and apparatus may be implemented in a sensing device, which outputs pre-processed capacitance data to a host, where the sensing device processes the capacitance data to compensate for quiescent and stray capacitance, and the host calculates X/Y movement and detects gestures from the pre-processed capacitance data. Alternatively, other configurations are possible.

The electronic system that includes the embodiments described herein may be implemented in a touch-sensor pad of a conventional laptop (e.g., notebook computer). Alternatively, it may be implemented in a wired or wireless keyboard integrating a touch-sensor pad, which is itself connected to a host. Alternatively, it may be implemented as a transparent touch screen. Alternatively, the embodiments may be implemented in a mobile handset (e.g., cellular or mobile phone) or other electronic devices where the touch-sensor pad or touch-sensor screen may operate in one of two or more modes. For example, the touch-sensor pad may operate either as a touch-sensor pad for X/Y positioning and gesture recognition, or as a keypad or other arrays of touch-sensor buttons and/or sliders. Alternatively, the touch-sensor pad, although configured to operate in the two modes, may be configured to be used only as a keypad, or only as a touch-sensor pad. Alternatively, the electronic device may be used in other applications, such as a personal data assistant (PDA), a kiosk, a keyboard, a television, a remote control, a monitor, a handheld multimedia device, a handheld video player, a handheld gaming device, or a control panel. In one embodiment, electronic system 300 is implemented in a device that includes a touch-sensor device for the user interface, such as handheld electronics, portable telephones, cellular telephones, notebook computers, personal data assistants (PDAs), kiosks, keyboards, televisions, remote controls, monitors, handheld multi-media devices, handheld video players, gaming devices, control panels of a household or industrial appliances, or the like. Alternatively, the electronic system 300 may be used in other types of devices.

It should be noted that the components of electronic system 300 may include all the components described above. Alternatively, electronic system 300 may include only some of the components described above, or include additional components not listed herein.

It should be noted that any one of various known methods for measuring capacitance may be used, for example relaxation oscillator methods, current versus voltage phase shift measurement, resistor-capacitor charge timing, capacitive bridge divider, charge transfer, successive approximation, sigma-delta modulation, charge-accumulation circuits, field effect, mutual capacitance, frequency shift, or the like.

In one embodiment, the conventional powered stylus used to interact with the capacitive touch-sensing device may be replaced by a non-powered stylus having a tip made of charged or polarized electret material. Electret is a dielectric material that has a quasi-permanent electric charge or dipole polarization. An electret generates internal and external electrostatic fields, and is the electrostatic equivalent of a permanent magnet.

Electrets may exhibit some similarities to a dielectric layer used in a capacitor. One difference is that a dielectric in a capacitor possesses an induced polarization that is dependent on the potential applied to the dielectric. Dielectrics with electret properties exhibit quasi-permanent charge storage or dipole polarization. Some materials also display ferroelectricity (i.e. they react to the external fields with a hysteresis of the polarization). Ferroelectrics can retain the polarization permanently because they are in thermodynamic equilibrium and are used in ferroelectric capacitors. Although electrets are only in a metastable state, those fashioned from very low leakage materials can retain excess charge or polarization for many years.

Materials used to form electrets are usually waxes, polymers or resins. One recipe for an electret consists of 45% carnauba wax, 45% white rosin, and 10% white beeswax, melted, mixed together, and left to cool in a static electric field of several kilovolts/cm. Electret materials are quite common in nature. Quartz and other forms of silicon dioxide, for example, are naturally occurring electrets. Many manufactured and commercially used electrets are made from synthetic polymers, e.g. fluoropolymers, polypropylene, polyethyleneterephthalate, or other synthetic polymers.

Generally, electrets fall into one of two classes: real-charge electrets and polled electrets. The difference between the classes is the orientation of the dipole molecules within the electret material.

Real-charge electrets contain excess charge of one or both polarities. The excess charge may remain on the material's surface, referred to as a surface charge, or may be within the materials volume, known as a space charge. Real-charge electrets can be manufactured by embedding excess negative charge within a dielectric using a particle accelerator, or by stranding charges on, or near, the surface using high voltage corona discharges, through a process called corona charging. Excess charge within an electret decays exponentially. The decay constant is a function of the material's relative dielectric constant and its bulk resistivity. Materials with extremely high resistivity, such as TEFLON™, may retain excess charge for many hundreds of years. Most commercially produced electrets are based on fluoropolymers (e.g., amorphous TEFLON™) machined to thin films.

Polled electrets contain dipoles that are all similarly oriented or aligned. Polled electrets can be prepared by taking a suitable dielectric material in a liquid form, subjecting the material to a strong electric field, and cooling it back to a solid form while still within the electric field. The electric field repositions the charge carriers or aligns the dipoles within the material. When the material cools, solidification freezes them in position.

In one embodiment, the electric field may be applied by two charging plates on opposing sides of the dielectric material. In this embodiment, all dipoles in the electret would be aligned the same direction. In an alternative embodiment, the electric field may be applied by placing a metal core in the center of the dielectric material and a second charging plate surrounding the material on the outside. In this embodiment, all dipoles are aligned facing from inside out or outside in, depending on the polarity of the plates. The result is an electrostatic field that radiates outward in all directions from the surface of the electret. In yet another embodiment, the electric field may be applied by charging plates oriented in some other manner.

Figure 4:
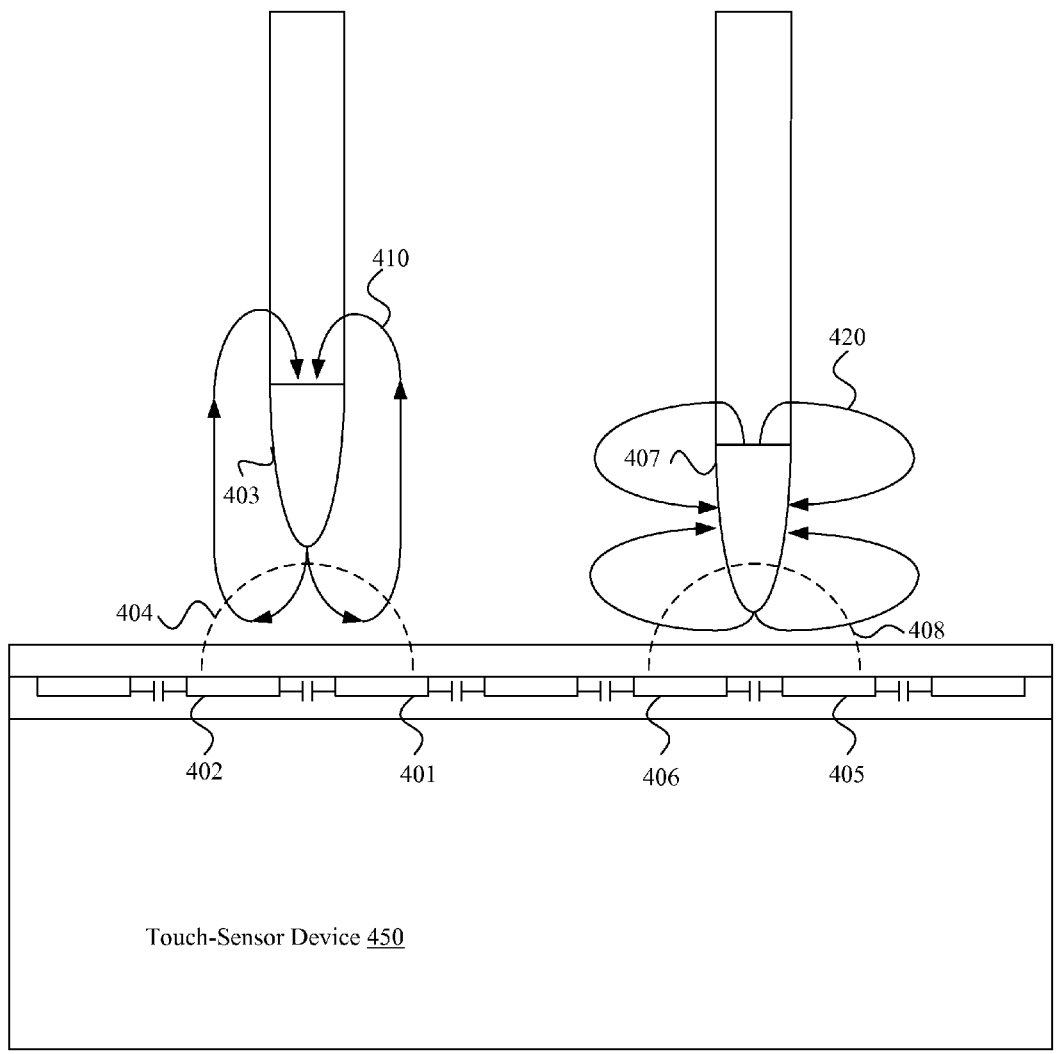
FIG. 4 illustrates electrostatic fields generated by an electret and interaction with one embodiment of a touch-sensing device.

FIG. 4 illustrates two variations on the electrostatic field given off by an electret. Both real-charge and polled electrets generate an electrostatic field. As long as the electrostatic field is strong enough to be sensed by the touch-sensing device, the electret may be used in an embodiment of this invention. The orientation and shape of the electrostatic field is a result of the electric field (if any) applied during the formation of the electret.

Electrostatic field 410 is a vertical charge electrostatic field given off by the electret 403. In this embodiment, the electrostatic field 410 radiates vertically from the electret 403. Electrostatic field 420 is a radial charge electrostatic field given off by the electret 407. In this embodiment, the electrostatic field 420 radiates outward in all directions from the outer surface of the electret 407.

FIG. 4 further illustrates touch-sensor device 450 including one or more capacitance sensor elements. In its basic form, a capacitance sensor element is a pair of adjacent conductors 401, 402 and 405, 406. There is a small edge-to-edge capacitance, but the intent of sensor element layout is to minimize the parasitic capacitance between these conductors. The charge being driven through conductors 401, 402 and 405, 406 generates an electrostatic field 404 and 408. The equivalent capacitance of this electrostatic field may be measured and stored as a baseline value. The electret 403, 407 portion of the stylus generates its own electrostatic field 410 and 420, as described above. When the electret 403, 407 is placed in proximity to the two conductors 401, 402 or 405, 406, the electrostatic field 410, 420 from the electret 403 or 407 interferes with the base electrostatic field 404 or 408 from conductors 401, 402 or 405, 406. The total electrostatic field can result from the combination of the base electrostatic field 404, 408 and the electret electrostatic field 410, 420. The base electrostatic field 404, 408 may be compared to the combined electrostatic field when the electret 403, 407 is present to determine the change in electrostatic field when the electret 503 is present and when the electret is not present on the sensor element. Effectively, the electrostatic field variation can be measured to determine whether an electret is present or not (e.g., sensor activation) on the sensor element.

A capacitance sensor element may be used in a capacitance sensor array. The capacitance sensor array is a set of capacitor plates where one side of each capacitor is connected to a system ground. When the capacitance sensor element is used to measure self capacitance in the sensor array, when the conductor 401, 405 is sensed, the conductor 402, 406 may be connected to ground, and when the conductor 402, 406 is sensed, the conductor 401, 405 may be connected to ground. Alternatively, when the sensor element is used for a touch-sensor button, the sensor element is sensed and the sensed button area may be surrounded by a fixed ground. The presence of the electret 403, 407 alters the total electrostatic field of the sensor element. Determining sensor element activation is then a matter of measuring change in the electrostatic field. A sensor element is also known as a grounded variable capacitor.

When the electret is brought in proximity to the touch-sensing device 450, the surface area affected by the associated electrostatic field is important to the functionality of the stylus. As discussed above, the touch-sensing device may have a sensor array organized into rows and columns. Various implementations may have differing spacing between sensor elements. It is important that the electrostatic field emitted by the stylus be large enough to be detected by multiple sensors so that the position can be accurately calculated.

In one embodiment where the electrostatic field 410 is oriented vertically to the position of the electret and approximately perpendicular to the touch-sensing screen, the effective area may not be much larger than the area of the electret tip of the stylus. Depending on the spacing between sensor elements, an accurate position may be difficult to determine. However, in an alternative embodiment where the electrostatic field 420 is oriented radially to the position of the electret and approximately parallel to the touch-sensing screen, the effective area may be significantly larger than the area of the electret tip of the stylus. This ensures that the electrostatic field 420 will be sensed by multiple sensors in both the X and Y dimensions.

Figure 5A:
FIG. 5A illustrates one embodiment of an electret stylus.

FIG. 5A illustrates one embodiment of an electret stylus. In this embodiment, a piece of electret material 504a is affixed at one end of a stylus. The electret 504a may be located at the end of the stylus used to physically contact the touch-sensing device. This electret tip 504a may be shaped so that it narrows in diameter as it reaches the end of the stylus to provide a smaller point of contact with the touch-sensing device. In alternative embodiments, the electret tip 504a may have the same diameter throughout, may increase in diameter as it reaches the end of the stylus, or may have other variations in diameter.

The remaining portion of the stylus 505a, aside from the electret tip 504a, may include a handle by which the user may hold the stylus. This remaining portion of the stylus 505a may be made from any conductive or non-conductive material. For example, the handle portion 405a may be made of plastic, wood, metal, or any other material.

Figure 5B:
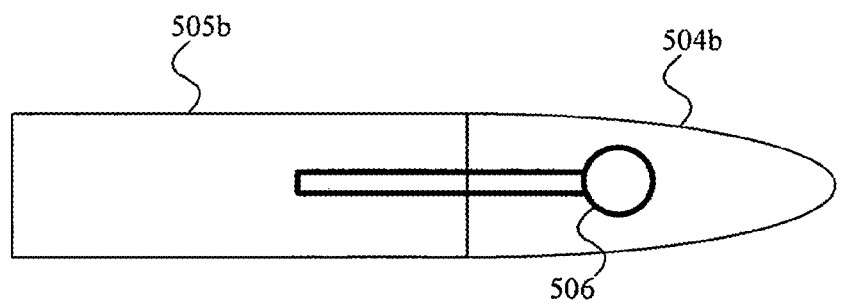
FIG. 5B illustrates another embodiment of an electret stylus.

FIG. 5B illustrates another embodiment of an electret stylus. In this embodiment, where the electret was formed with a center probe 506, the metal probe 506 may be extended out of the electret material 504b and used to couple the electret to the handle of the stylus 505b. In alternative embodiments the electret 504b may be coupled to the handle of the stylus 505b using other means, e.g., glue, injection moulding, press fit, threaded shaft, and thermoset adhesive.

The electret tip on the stylus emits an electrostatic field that may be sensed by a capacitive-sensing touch panel. The electret tip stylus can serve as replacement for a conventional powered stylus or simply the user's finger. The inherent electrostatic field given off by the electret functions similarly to the electrostatic field generated by the powered plates of a conventional capacitor. In this manner, the electret stylus may be used with the same touch panel technology that previously functioned only with a powered stylus or the user's finger.

As described above, electret material has a quasi-permanent electric charge. An electret may suffer from charge bleed off over time. The half-life of the charge may be determined by the type and quality of the dielectric material and the amount of exposure to environment factors. An electret made from TEFLON™ material may have an expected usable life of 10-100 years. Electrets made from other materials may have an expectancy of more or less than that of a TEFLON™ electret.

In certain embodiments, an electret stylus may be used with capacitive sensing touch screens on point of sale systems, on ATMs, on mobile handsets, on kiosks, on game consoles, or on PDAs. Due to advances in electronics and computing technologies the usable life expectancy may only be a few years, with new technology rendering the older devices obsolete. While in certain instances the usable life expectancy of the electret material used in the stylus may far exceed the usefulness of the device with which the stylus is used, there may be certain applications where it is desirable to prolong the life of the stylus.

One method for preserving the charge stored by an electret involves shorting out the surface of the electret. In an electret, the normal electric dipole movement would point from negative charge to the positive charge. Shorting the electret effectively provides an alternate connection between the negative and positive charges. Shorting the entire surface of the electret alters normal dipole movement and prevents charge from dissipating over time as it normally would. This serves to increase the usable life of the electret.

Figure 6A:
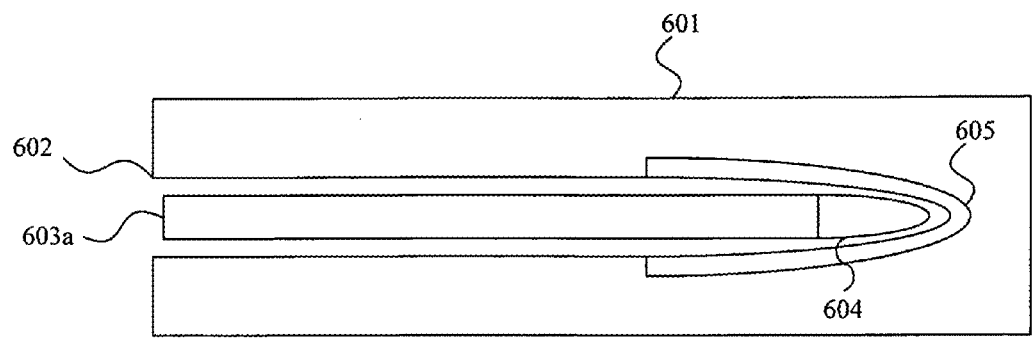
FIG. 6A illustrates one embodiment of a socket with conductive lining for storage of the electret stylus.

FIG. 6A illustrates one embodiment of a socket with conductive lining for storage of the electret stylus. In one embodiment, the touch-sensing device 601, in which the capacitance sensing touchpad or touch screen is implemented, may have a socket 602 within the device 601 where the stylus 603a may be stored when not in use. The socket 602 may take the form of a hole, slot, or other opening in part of the device. The socket 602 may be deep enough to cover the entire stylus 603a when the stylus is stored in the socket, or the socket 602 may be only deep enough to receive a portion of the stylus 603a. Normally, the stylus 603a may be stored in the socket by inserting the electret 604 tipped end first. In another embodiment, the socket 602, may not be within the device 601, but instead may be within a vessel that is separate from the touch-sensing device.

In one embodiment, the interior of the socket 602 may be lined with a compliant conductive material 605 that effectively shorts out the surface of the electret 604. In another embodiment, the interior of the socket 602 may be lined with non-compliant or partially-compliant pieces of conductive material. The conductive material 605 may be a metallic foil or any other conductor that can substantially cover the surface of the electret 604. Shorting out the surface of electret, as discussed above, may help preserve the charge on the electret and extend the usable lifetime of the stylus.

Figure 6B:
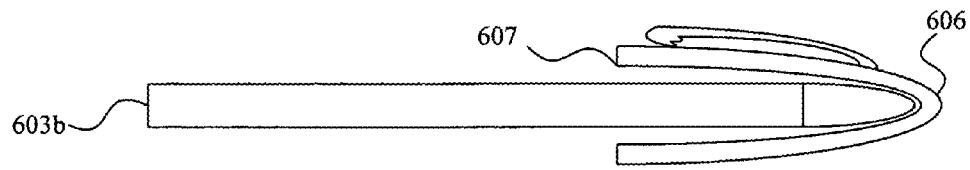
FIG. 6B illustrates one embodiment of a stylus cap with conductive lining.

FIG. 6B illustrates one embodiment of a stylus cap with conductive lining. If the device with which the stylus 603b is to be used does not have a dedicated socket to store the stylus, a protective cap 606 may be used to cover the electret tipped end of the stylus when not in use. The cap 606 may have an interior lining 607 of conductive material similar to that of the built-in socket discussed above. The cap 606 may be similar to a conventional cap used on a pen, marker, etc. except for the interior lining. The conductive lining 607 may short out the surface of the electret, preventing charge dissipation or depolarization, thereby increasing its usable life expectancy.

Certain embodiments of the method, apparatus, and system described above may offer advantages, compared to conventional technologies, including one or more of the following: low manufacturing costs, simplicity of design, and increased accuracy and visibility.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A touch-sensor device stylus, comprising:
   a body having a first end and a second end;
   a piece of electret material coupled to the first end of the body, wherein the piece of electret material emits a first field to be sensed by a capacitive touch-sensor device by measuring an effect of the first field emitted by the piece of electret material on a second field emitted by the capacitive touch-sensor device, wherein the effect of the first field is determined by comparing a combined field that is formed by an interference of the first field emitted by the piece of electret material with the second field emitted by the capacitive touch-sensor device to the second field, wherein the effect of the first field is used to determine a position of the touch-sensor device stylus, and wherein the piece of electret material comprises a metal core in the piece of electret material that is associated with a direction of the first field, and wherein the piece of electret material further comprises a metal probe that is coupled to the metal core and extends out of the piece of electret material to couple the piece of electret material to the body of the touch-sensor device stylus; and
   a socket to receive the first end of the body, wherein an interior surface of the socket is lined with a conductive material to contact a surface of the piece of electret material to short the surface of the piece of electret material emitting the first field when the first end of the body is inserted into the socket.

2. The touch-sensor device stylus of claim 1, wherein the piece of electret material at the first end of the body tapers to a point.

3. The touch-sensor device stylus of claim 1, wherein the second end of the body comprises a handle.

4. An apparatus comprising the touch-sensor device stylus of claim 1, wherein the socket is within the capacitive touch-sensor device.

5. The apparatus of claim 4, wherein the conductive material is disposed within the socket to contact substantially an entire surface of the piece of electret material.

6. The touch-sensor device stylus of claim 1, wherein the piece of electret material comprises a fluoropolymer.

7. The touch-sensor device stylus of claim 1, wherein the piece of electret material comprises a wax.

8. The touch-sensor device stylus of claim 1, wherein the piece of electret material comprises a resin.

9. The touch-sensor device stylus of claim 1, wherein the piece of electret material comprises polypropylene.

10. The touch-sensor device stylus of claim 1, wherein the piece of electret material comprises a synthetic polymer.

11. The touch-sensor device stylus of claim 1, wherein the first field is an electrostatic field, and wherein the second field is generated by a charge being driven through conductors of the capacitive touch-sensor device.

12. A method, comprising
    providing a touch-sensor device stylus having a piece of electret material coupled to a first end of the stylus;
    emitting a first field from the piece of electret material to be sensed by a capacitive touch-sensor device by measuring an effect of the first field emitted by the piece of electret material on a second field emitted by the capacitive touch-sensor device, and wherein the effect of the first field is determined by comparing a combined field that is formed by an interference of the first field emitted by the piece of electret material with the second field emitted by the capacitive touch-sensor device to the second field, wherein the effect of the first field is used to determine a position of the touch-sensor device stylus, wherein the piece of electret material comprises a metal core in the piece of electret material that is associated with a direction of the first field, and wherein the piece of electret material further comprises a metal probe that is coupled to the metal core and extends out of the piece of electret material to couple the piece of electret material to a body of the touch-sensor device stylus; and
    providing a socket to receive the first end of the touch-sensor device stylus, wherein an interior surface of the socket is lined with a conductive material to contact a surface of the piece of electret material to short the surface of the piece of electret material emitting the first field when the first end of the touch-sensor device stylus is inserted into the socket.

13. The method of claim 12, further comprising:
    sensing the first field from the piece of electret material and determining the position of the stylus in relation to the capacitive touch-sensor device.

14. The method of claim 13, wherein determining the position of the stylus comprises comparing the second field produced by the capacitive touch-sensor device to the combined field produced by the capacitive touch-sensor device and the piece of electret material.

15. The method of claim 12, wherein the capacitive touch-sensor device is a touchpad device.

16. The method of claim 12, wherein the capacitive touch-sensor device is a touch screen device.

17. The method of claim 12, wherein the first field is an electrostatic field, and wherein the second field is generated by a charge being driven through conductors of the capacitive touch-sensor device.

18. A method, comprising:
    providing a body of a touch-sensor device stylus having a first end and a second end;
    coupling a piece of electret material to the first end of the body, wherein the piece of electret material emits a first field to be sensed by a capacitive touch-sensor device by measuring an effect of the first field emitted by the piece of electret material on a second field emitted by the capacitive touch-sensor device, wherein the effect of the first field is determined by comparing a combined field that is formed by an interference of the first field emitted by the piece of electret material with the second field emitted by the capacitive touch-sensor device to the second field, and wherein the effect of the first field is used to determine a position of the touch-sensor device stylus, and wherein the piece of electret material comprises a metal core in the piece of electret material that is associated with a direction of the first field, and wherein the piece of electret material further comprises a metal probe that is coupled to the metal core and extends out of the piece of electret material to couple the piece of electret material to the body of the touch-sensor device stylus; and providing a socket to receive the first end of the body, wherein an interior surface of the socket is lined with a conductive material to contact a surface of the piece of electret material to short the surface of the piece of electret material emitting the first field when the first end of the body is inserted into the socket.

19. The method of claim 18, wherein coupling the piece of electret material to the first end of the body comprises affixing the piece of electret material to the first end of the body.

20. The method of claim 18, wherein the piece of electret material comprises a fluoropolymer.

* * * * *